United States Patent
Hu et al.

(10) Patent No.: US 9,429,273 B2
(45) Date of Patent: Aug. 30, 2016

(54) VESSEL APPARATUS WITH FLOW CONTROL ELEMENT

(71) Applicant: General Electric Company, Schenectady, NY (US)

(72) Inventors: Lishun Hu, Shanghai (CN); Wei Chen, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 13/875,510

(22) Filed: May 2, 2013

(65) Prior Publication Data
US 2013/0292390 A1    Nov. 7, 2013

(30) Foreign Application Priority Data
May 3, 2012    (CN) .......................... 2012 1 0135716

(51) Int. Cl.
*B65D 21/00*    (2006.01)
*F17C 13/00*    (2006.01)
*F16J 12/00*    (2006.01)

(52) U.S. Cl.
CPC .............. *F17C 13/002* (2013.01); *F16J 12/00* (2013.01)

(58) Field of Classification Search
CPC ....... F17C 13/002; B01F 5/244; B01F 5/242
USPC .......... 220/581; 406/45, 181; 210/137, 320; 239/650, 666, 668, 683, 76, 310, 345, 239/344, 499; 13/581
See application file for complete search history.

(56) References Cited

U.S. PATENT DOCUMENTS

| | | | |
|---|---|---|---|
| 3,216,629 A * | 11/1965 | Goins | B01F 5/242 222/459 |
| 4,844,663 A * | 7/1989 | Salter | B01J 3/02 406/12 |
| 4,869,622 A | 9/1989 | Salter et al. | |
| 5,123,632 A | 6/1992 | Schmit et al. | |
| 5,248,197 A * | 9/1993 | Storf et al. | 366/341 |
| 5,587,048 A | 12/1996 | Streisel et al. | |
| 5,769,281 A * | 6/1998 | Bates | 222/196 |
| 7,007,630 B2 * | 3/2006 | Garcia | E01F 9/0175 116/63 C |
| 7,114,638 B2 * | 10/2006 | Vaynshteyn et al. | 222/181.1 |
| 2009/0166273 A1 * | 7/2009 | Mormino et al. | 210/107 |

(Continued)

FOREIGN PATENT DOCUMENTS

| | | |
|---|---|---|
| CN | 2111205 U | 7/1992 |
| CN | 1017873 B | 8/1992 |
| CN | 1376761 A | 10/2002 |

(Continued)

OTHER PUBLICATIONS

Royal et al., "Fine powder flow phenomena in bins, hoppers, and processing vessels", Presented at Bulk 2000: Bulk Material Handling Towards the Year 2000, pp. 1-10, 1991.

(Continued)

*Primary Examiner* — Steven A. Reynolds
*Assistant Examiner* — King M Chu
(74) *Attorney, Agent, or Firm* — GE Global Patent Operation; Peter T. DiMauro

(57) ABSTRACT

A vessel apparatus includes a pressurized vessel and at least one flow control element. The at least one flow control element is located within the pressurized vessel and has an upwardly-converging wall.

13 Claims, 2 Drawing Sheets

(56) References Cited

U.S. PATENT DOCUMENTS

| | | | |
|---|---|---|---|
| 2010/0038303 A1* | 2/2010 | Cai | B01L 3/56 210/406 |
| 2011/0232547 A1 | 9/2011 | Schmit et al. | |

FOREIGN PATENT DOCUMENTS

| | | |
|---|---|---|
| CN | 2808837 Y | 8/2006 |
| CN | 1279314 C | 10/2006 |
| CN | 1915774 A | 2/2007 |
| CN | 2918333 Y | 7/2007 |
| CN | 200940041 Y | 8/2007 |
| CN | 200948983 Y | 9/2007 |
| CN | 100450901 C | 1/2009 |
| CN | 101790415 A | 7/2010 |

OTHER PUBLICATIONS

Purutyan et al., "Improve solids handling during thermal drying", Solids Handling, Chemical Engineering Progress (CEP), pp. 26-30, Nov. 2004.

Unofficial English translation of Office Action issued in connection with corresponding CN Application No. 201210135716.3 on Feb. 27, 2015.

* cited by examiner

VESSEL APPARATUS WITH FLOW CONTROL ELEMENT

BACKGROUND

Embodiments of the present invention relate generally to a vessel apparatus, and more particularly relate to a high pressure vessel apparatus having one or more flow control elements in a pressurized vessel to equalize a flow rate of substances discharged from the pressurized vessel.

Various vessel apparatuses have been built for discharging substances such as particulate solids. The vessel apparatus includes a pressurized vessel having an inlet orifice at an upper end thereof and an outlet orifice at a lower end thereof. The substances are injected into the pressurized vessel from the inlet orifice and discharged from the outlet orifice. Usually, the substances not near walls of the pressurized vessel flow out easily and form a flow path, and the substances near the walls of the pressurized vessel flow slowly or even stagnate to form a dead region. After the substances in the flow path are discharged, the substances in the dead region collapse which results in the flow rate of the substances decreases. Therefore, the flow rate of the substances is unstable and affects the injection of the substances into an apparatus, such as a burner, receiving the substances from the outlet orifice of the vessel apparatus.

It is desirable to provide a vessel apparatus to address the above-mentioned problem.

BRIEF DESCRIPTION

In accordance with an embodiment of the present invention, a vessel apparatus includes a pressurized vessel and at least one flow control element. The at least one flow control element is located within the pressurized vessel and has an upwardly-converging wall.

In accordance with an embodiment of the present invention, a vessel apparatus includes a pressurized vessel and at least one flow control element. The pressurized vessel has a downwardly-converging wall. The at least one flow control element is located within the pressurized vessel and has an upwardly-converging wall. One or more downwardly-converging channels are formed between the downwardly-converging wall and the upwardly-converging wall.

In accordance with an embodiment of the present invention, a vessel apparatus includes a pressurized vessel and a flow control mechanism. The flow control mechanism is mounted in the pressurized vessel and forms one or more downwardly-converging channels in the pressurized vessel.

BRIEF DESCRIPTION OF THE DRAWINGS

These and other features and aspects of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
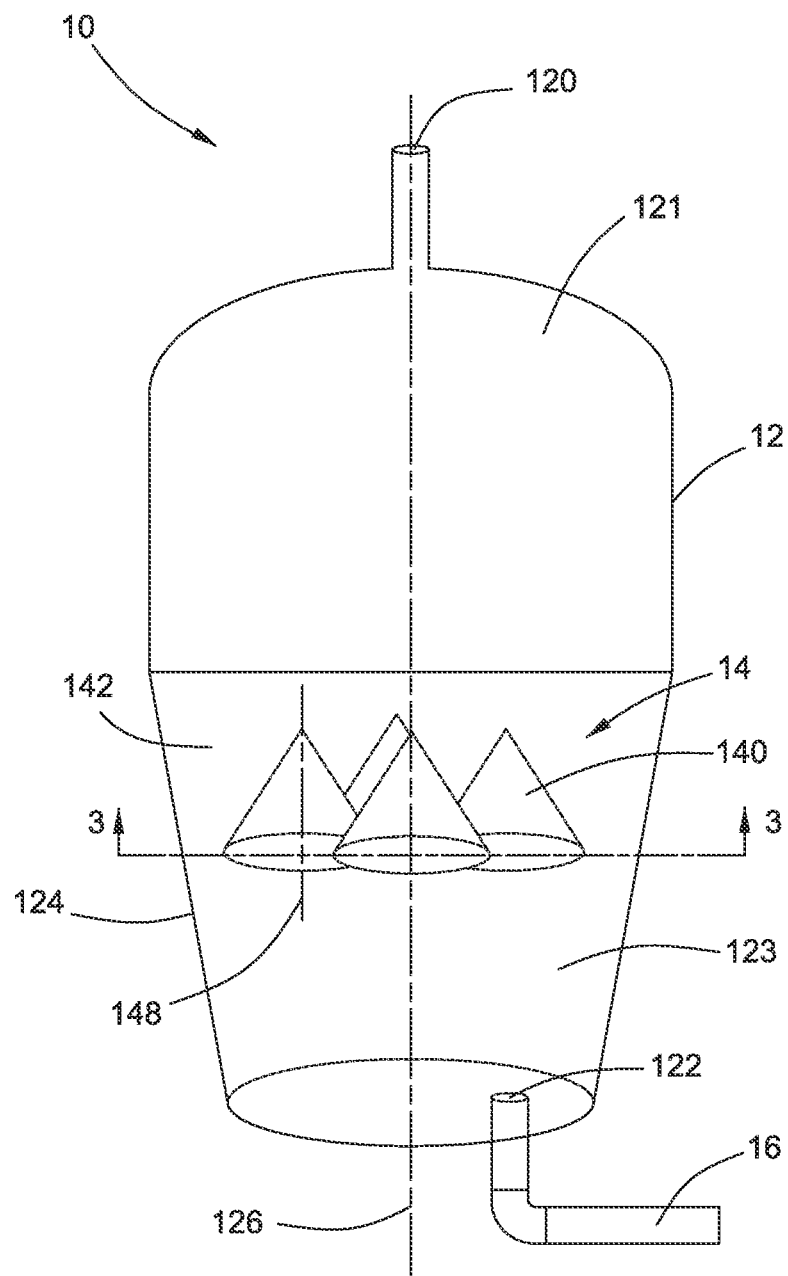
FIG. 1 is a schematic diagram of a vessel apparatus in accordance with an embodiment of the present invention.

FIG. 1 illustrates a schematic diagram of a vessel apparatus 10 in accordance with an embodiment of the present invention. The vessel apparatus 10 for uniformly discharging substances (not shown), such as particulate solids, therefrom includes a pressurized vessel 12 and a flow control mechanism 14 mounted in the pressurized vessel 12. The pressurized vessel 12 is configured to receive and discharge the substances. The pressurized vessel 12 is structured to withstand pressures ranging from about 0 bar absolute to about 200 bar absolute. In the illustrated embodiment of the present invention, the pressurized vessel 12 has an upper portion 121 and a lower portion 123 communicating with the upper portion 121. The upper portion 121 is substantially cylinder-shaped for receiving the substances. The lower portion 123 has a downwardly-converging wall 124 for discharging the substances. The lower portion 123 is back-off circular truncated cone shaped. In an embodiment of the present invention, the lower portion 123 is hopper-shaped or in any other shapes.

The pressurized vessel 12 has an inlet orifice 120 in the upper portion 121 thereof and an outlet orifice 122 in the lower portion 123 thereof. The substances are injected from the inlet orifice 120 into the pressurized vessel 12 and discharged from the outlet orifice 122 into a device (not shown), such as a burner, a reactor and so on, which communicates with the vessel apparatus 10. In the illustrated embodiment of the present invention, the vessel apparatus 10 has an outlet pipe 16 connecting the outlet orifice 122 and the device (not shown). The pressurized vessel 12 has only one outlet orifice 122 so as to measure and control the discharged substances easily. In embodiments of the present invention, the pressurized vessel 12 has two or more than two outlet orifices 122.

Figure 2:
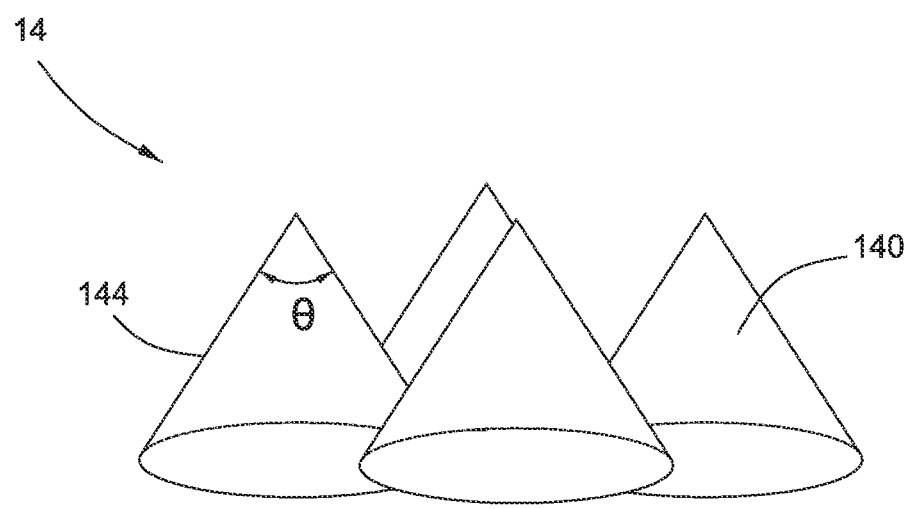
FIG. 2 is a schematic diagram of flow control elements of the vessel apparatus of FIG. 1.
Figure 3:
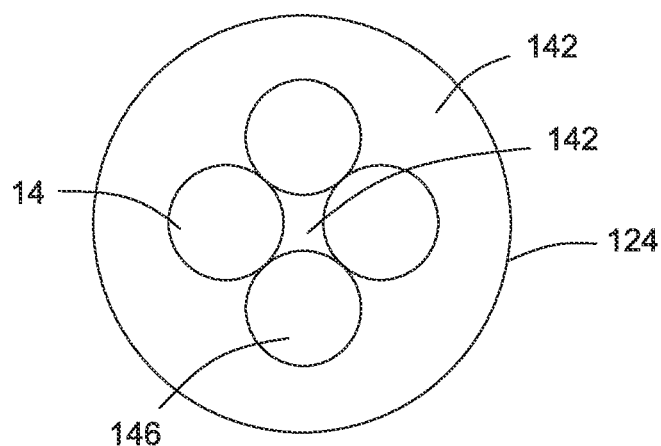
FIG. 3 is a sectional view of the vessel apparatus taken along line 3-3 of FIG. 1.

Referring to FIGS. 1 to 3, the flow control mechanism 14 is positioned in the lower portion 123 of the pressurized vessel 12. The flow control mechanism 14 forms one or more downwardly-converging channels 142 in the pressurized vessel 12. The downwardly-converging channels 142 are formed between the flow control mechanism 14 and the downwardly-converging wall 124 of the pressurized vessel 12 and/or formed through the flow control mechanism 14. The substances flow though the downwardly-converging channels 142 to form local mass flow, thus it improves the flow ability and increases the discharging stability.

The flow control mechanism 14 includes at least one flow control element 140 located within the pressurized vessel 12. The illustrated embodiment of the present invention shows four flow control elements 140 for example. The number of the flow control elements 140 may change according to particular applications. In embodiments of the present invention, the flow control mechanism 14 may have one, two or more than two flow control elements 140. The bulkier the pressurized vessel 12 is, the more flow control elements 140 may be utilized to make sure the downwardly-converging channels 142 is narrow enough to form local mass flow.

The flow control elements 140 are positioned in the lower portion 123 of the pressurized vessel 12. A height of each of the flow control elements 140 is less than that of the lower portion 123 of the pressurized vessel 12 and the flow control elements 140 are away from a lower end of the pressurized vessel 12. Each of the flow control elements 140 has an upwardly-converging wall 144. The downwardly-converging channels 142 are formed between the downwardly-converging wall 124 of the pressurized vessel 12 and the upwardly-converging wall 144 and formed between the upwardly-converging walls 144 of the flow control elements 140.

The flow control elements 140 have the same shape and size which are preferred to minimize interferences between the flow control elements 140 so as to equalize the flow rate of the discharged substances. Each of the flow control elements 140 is cone-shaped having an included angle θ less than 90 degrees, preferably 20-40 degrees. The included angle θ of the flow control element 140 can be changed to form the local mass flow and lower wall friction. The exterior of the upwardly-converging walls 144 of the flow control elements 140 and/or the interior of the downwardly-converging wall 124 of the pressurized vessel 12 may be coated with polyethylene or with any other material well known to the art for reducing the wall friction.

Each of the flow control elements 140 has a longitudinal axis 148 parallel to a longitudinal axis 126 of the pressurized vessel 12 because parallelism contributes to uniform substances movement by gravity so as to achieve an equalized flow rate of substances discharged therefrom. The flow control elements 140 are arranged latitudinal and adjacent to each other. Round bottom surfaces 146 of adjacent flow control elements 140 are tangent. In embodiments of the present invention, the flow control elements 140 are close to each other but don't contact each other to leave spaces there between.

The flow control element 140 may be formed by molding so that it is easy to manufacture. The flow control element 140 may be solid or hollow. The flow control element 140 is mounted in the pressurized vessel 12 through thin sticks (not shown) or any other means connecting the flow control element 140 and the pressurized vessel 12. In embodiments of the present invention, the flow control element 140 and the pressurized vessel 12 may be molded integrally.

While embodiments of the present invention have been described herein, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the present invention not be limited to the particular embodiment of the present invention disclosed as the best mode contemplated for carrying out the present invention, but that the present invention will include all embodiments falling within the scope of the appended claims.

Furthermore, the skilled artisan will recognize the interchangeability of various features from different embodiments of the present invention. The various features described, as well as other known equivalents for each feature, can be mixed and matched by one of ordinary skill in this art to construct additional systems and techniques in accordance with principles of this disclosure.

What is claimed is:

1. A vessel apparatus comprising:
   a pressurized vessel having an upper portion and a lower portion, and comprising an inlet orifice in the upper portion and at least one outlet orifice in the lower portion for discharge from the vessel; and
   a plurality of cone shaped flow control elements located within the pressurized vessel arranged latitudinal and adjacent each other, each flow control element having an upwardly-converging wall;
   wherein the lower portion of the pressurized vessel has a downwardly-converging wall, and the plurality of flow control elements are positioned in the lower portion of the pressurized vessel, and wherein the adjacent flow control elements form at least one downwardly converging channel located in a center of the pressurized vessel.

2. The vessel apparatus of claim 1, wherein at least one flow control element has an included angle less than 90 degrees.

3. The vessel apparatus of claim 1, wherein at least one flow control element has a longitudinal axis parallel to a longitudinal axis of the pressurized vessel.

4. The vessel apparatus of claim 1, wherein the plurality of flow control elements have the same shape and size.

5. A vessel apparatus comprising:
   a pressurized vessel having an upper portion and a lower portion, and comprising an inlet orifice in the upper portion and at least one outlet orifice in the lower portion for discharge from the vessel, said lower portion having a downwardly-converging wall; and
   a plurality of cone shaped flow control elements located within the pressurized vessel arranged latitudinal and adjacent each other, each flow control element having an upwardly-converging wall;
   wherein more than one downwardly-converging channels are formed between the downwardly-converging wall and the upwardly-converging walls of the plurality of flow control elements, and wherein the adjacent flow control elements form at least one downwardly converging channel located in a center of the pressurized vessel.

6. The vessel apparatus of claim 5, wherein at least one flow control element has an included angle less than 90 degrees.

7. The vessel apparatus of claim 5, wherein at least one flow control element has a longitudinal axis parallel to a longitudinal axis of the pressurized vessel.

8. The vessel apparatus of claim 5, wherein the plurality of flow control elements have the same shape and size.

9. A vessel apparatus comprising:
   a pressurized vessel; and
   a flow control mechanism mounted in the pressurized vessel and forming more than one downwardly-converging channel in the pressurized vessel; wherein a lower portion of the pressurized vessel has a downwardly-converging wall, and the flow control mechanism is positioned in the lower portion of the pressurized vessel;
   wherein the flow control mechanism comprises a plurality of cone-shaped flow control elements arranged latitudinal and adjacent each other, wherein the adjacent flow control elements form at least one downwardly converging channel located in a center of the pressurized vessel.

10. The vessel apparatus of claim 9, wherein the least one cone-shaped flow control element comprises an upwardly-converging wall.

11. The vessel apparatus of claim 9, wherein the at least one cone-shaped flow control element has an included angle less than 90 degrees.

12. The vessel apparatus of claim 9, wherein the at least one cone-shaped flow control element has a longitudinal axis parallel to a longitudinal axis of the pressurized vessel.

13. The vessel apparatus of claim 9, wherein the pressurized vessel has an upper portion and a lower portion, and comprising an inlet orifice in the upper portion and at least one outlet orifice in the lower portion for discharge from the vessel.

* * * * *